United States Patent
Matsuura et al.

(10) Patent No.: US 7,837,000 B2
(45) Date of Patent: Nov. 23, 2010

(54) ALL TERRAIN VEHICLE WITH DRIVE-CHAIN TENSION ADJUSTER

(75) Inventors: Tatsuya Matsuura, Shizuoka (JP); Tomoyuki Hayashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 358 days.

(21) Appl. No.: 11/965,416

(22) Filed: Dec. 27, 2007

(65) Prior Publication Data

US 2009/0014992 A1    Jan. 15, 2009

Related U.S. Application Data

(60) Provisional application No. 60/949,576, filed on Jul. 13, 2007.

(51) Int. Cl.
*B60K 17/00* (2006.01)
(52) U.S. Cl. ............... 180/351; 180/231; 180/357; 180/366; 474/112; 474/116
(58) Field of Classification Search .......... 180/231, 180/350, 351, 357, 366, 373; 474/58, 101, 474/109, 112, 113, 116, 117, 120, 133, 136, 474/903
See application file for complete search history.

(56) References Cited

U.S. PATENT DOCUMENTS

| | | | | |
|---|---|---|---|---|
| 4,061,050 A | * | 12/1977 | Bolger | 74/469 |
| 4,463,824 A | * | 8/1984 | Boyesen | 180/227 |
| 4,667,761 A | * | 5/1987 | Takayanagi | 180/217 |
| 4,714,453 A | * | 12/1987 | Takayanagi | 474/112 |
| 5,007,497 A | * | 4/1991 | Trema | 180/219 |
| 5,752,892 A | * | 5/1998 | Taomo et al. | 474/112 |
| 6,206,398 B1 | | 3/2001 | Yanai et al. | |
| 6,286,619 B1 | * | 9/2001 | Uchiyama et al. | 180/337 |
| 2008/0139353 A1 | * | 6/2008 | Stepniak et al. | 474/112 |

FOREIGN PATENT DOCUMENTS

JP     2000-108975 A    4/2000

\* cited by examiner

*Primary Examiner*—Ruth Ilan
(74) *Attorney, Agent, or Firm*—Keating & Bennett, LLP

(57) ABSTRACT

An all terrain vehicle includes a caliper bracket that moves with the movement of a rear axle by the rotation of an eccentric hub. The eccentric hub rotatably supports the rear axle in a position eccentric to the radial center of an axle supporting section. The caliper bracket includes a range specifying section or, specifically, a first engaging portion, which engages with the rear arm, for specifying the rotating range of the eccentric hub according to the position of engagement with the rear arm. The rear arm includes a second engaging portion that engages with the first engaging portion.

12 Claims, 10 Drawing Sheets

ALL TERRAIN VEHICLE WITH DRIVE-CHAIN TENSION ADJUSTER

This application claims priority from and incorporates by reference U.S. Provisional Patent Application Ser. No. 60/949,576 filed Jul. 13, 2007, entitled "All Terrain Vehicle With Drive-Chain Tension Adjuster."

BACKGROUND OF THE INVENTION

1. Field of the Invention

The present invention relates to an all terrain vehicle having a structure for adjusting the tension of the drive chain using an eccentric hub that rotatably supports the rear axle in a position eccentric to the center of the axle supporting section, and the method of adjusting the tension thereof.

2. Description of the Related Art

Hitherto, so-called all terrain vehicles (ATVs) have been provided which can travel on any terrain such as bog, sandy beaches, snowy roads, and mountain paths. All terrain vehicles generally have two rear wheels, that is, a right rear wheel and a left rear wheel. The right rear wheel and the left rear wheel are connected to a rear axle. The rear axle is rotatably supported by the axle supporting section of the rear arm and rotated by a driven sprocket around which a drive chain is wound.

For such all terrain vehicles, a structure is known in which the tension of the drive chain is adjusted by an eccentric hub, a so-called eccentric mechanism, that supports the rear axle rotatably in a position eccentric to the center of the axle supporting section (for example, JP-A-2000-108975, pp. 3-4, FIG. 4).

Specifically, the rear axle is passed through an eccentric hub that off-centers the rear axle from the center of the axle supporting section. When the all terrain vehicle is moved rearward, after a tightening bolt at the axle supporting section has been loosened, the rear axle is moved rearward owing to the shape of the eccentric hub. When the rear axle is moved rearward, the driven sprocket is separated from a drive sprocket disposed ahead of the driven sprocket to increase the tension of the drive chain. Then the tightening bolt at the axle supporting section is tightened at a position where an appropriate tension of the drive chain is given, so that the adjustment of the tension of the drive chain is completed.

However, such a related-art drive-chain adjusting structure has the following problem: if an all terrain vehicle is excessively moved backward during adjustment of the tension of the drive chain, the tension is loosened.

Specifically, if an all terrain vehicle is excessively moved backward, the rear axle is moved forward from a position most eccentric to the center of the axle supporting section, that is, from the position nearest the back. That is, the tension of the drive chain is loosened as the driven sprocket approaches the drive sprocket.

SUMMARY OF THE INVENTION

The invention is made in view of such circumstances. Accordingly, it is an object of the invention to provide an all terrain vehicle having a structure in which the tension of a beltlike transfer section such as a drive chain is adjusted using an eccentric hub that supports a rear axle rotatably in a position eccentric to the center of the axle supporting section wherein the tension of the beltlike transfer section is prevented from loosening.

The invention has the following characteristics to solve the above problem. According to a first aspect of the invention, there is provided an all terrain vehicle (all terrain vehicle 10) including: rear wheels (rear wheels 90L and 90R); a rear axle (rear axle 91) connected to the rear wheels; an eccentric hub (eccentric hub 120) through which the rear axle is passed, for supporting the rear axle rotatably; a cylindrical axle supporting section (axle supporting section 110) having a circular hole and restricting the rotation of the eccentric hub by clamping the eccentric hub; a vehicle body (vehicle body 10a) having the axle supporting section; a circular driven section (driven sprocket 43) fixed to the rear axle, configured to rotate with the rear axle, and concentric with the rear axle; a beltlike transfer section (drive chain 41) wound around the circular driven section, for transferring driving force to the circular driven section; and a part supporting member (caliper bracket 130) moving with the movement of the rear axle by the rotation of the eccentric hub, the part supporting member including a range specifying section (for example, engaging part 131) that engages with the vehicle body, for specifying the rotating range of the eccentric hub according to the position of engagement with the vehicle body. The eccentric hub rotatably supports the rear axle in a position eccentric to the radial center (center C2) of the inside diameter of the axle supporting section.

The second aspect of the invention is the all terrain vehicle according to the first aspect of the invention, wherein the range specifying section includes a first engaging portion (engaging section 131); the vehicle body includes a second engaging portion (shaft 102) that engages with the first engaging portion, wherein the second engaging portion specifies the rotating range of the eccentric hub by limiting the moving range of the first engaging portion.

The third aspect of the invention is the all terrain vehicle according to the second aspect of the invention, wherein the all terrain vehicle further includes: a circular driving section (drive sprocket 42) disposed ahead of the circular driven section, for driving the circular driven section via the beltlike transfer section, wherein the second engaging portion limits the rotating range of the eccentric hub within the range ahead of a position (position P1) at which the rear axle is most apart from the circular driving section.

The fourth aspect of the invention is the all terrain vehicle according to the second aspect of the invention, wherein the second engaging portion has a protruding shape; and the first engaging portion has a hole that movably holds the second engaging portion movably held.

The fifth aspect of the invention is the all terrain vehicle according to the fourth aspect of the invention, wherein the first engaging portion has a long hole (long hole 131a) that movably holds the second engaging portion.

The sixth aspect of the invention is the all terrain vehicle according to the first aspect of the invention, wherein the first engaging portion (engaging protruding portion 131X) has a protruding shape; and the second engaging portion has a hole shape (long hole 105) that movably holds the first engaging portion.

The seventh aspect of the invention is the all terrain vehicle according to the first aspect of the invention, wherein the all terrain vehicle further includes a disc brake (disc brake 50) for braking the rotation of the rear wheels, wherein the disc brake includes a brake caliper (brake caliper 51); and the part supporting member supports the brake caliper.

The eighth aspect of the invention is the all terrain vehicle according to the seventh aspect of the invention, wherein the range specifying section includes a first engaging portion (engaging portion 131); the vehicle body includes a second engaging portion (shaft 102) that engages with the first engaging portion, wherein the rotation of the part supporting member around the rear axle is restricted by the engagement between the first engaging portion and the second engaging portion.

DESCRIPTION OF THE PREFERRED EMBODIMENTS

Figure 1:
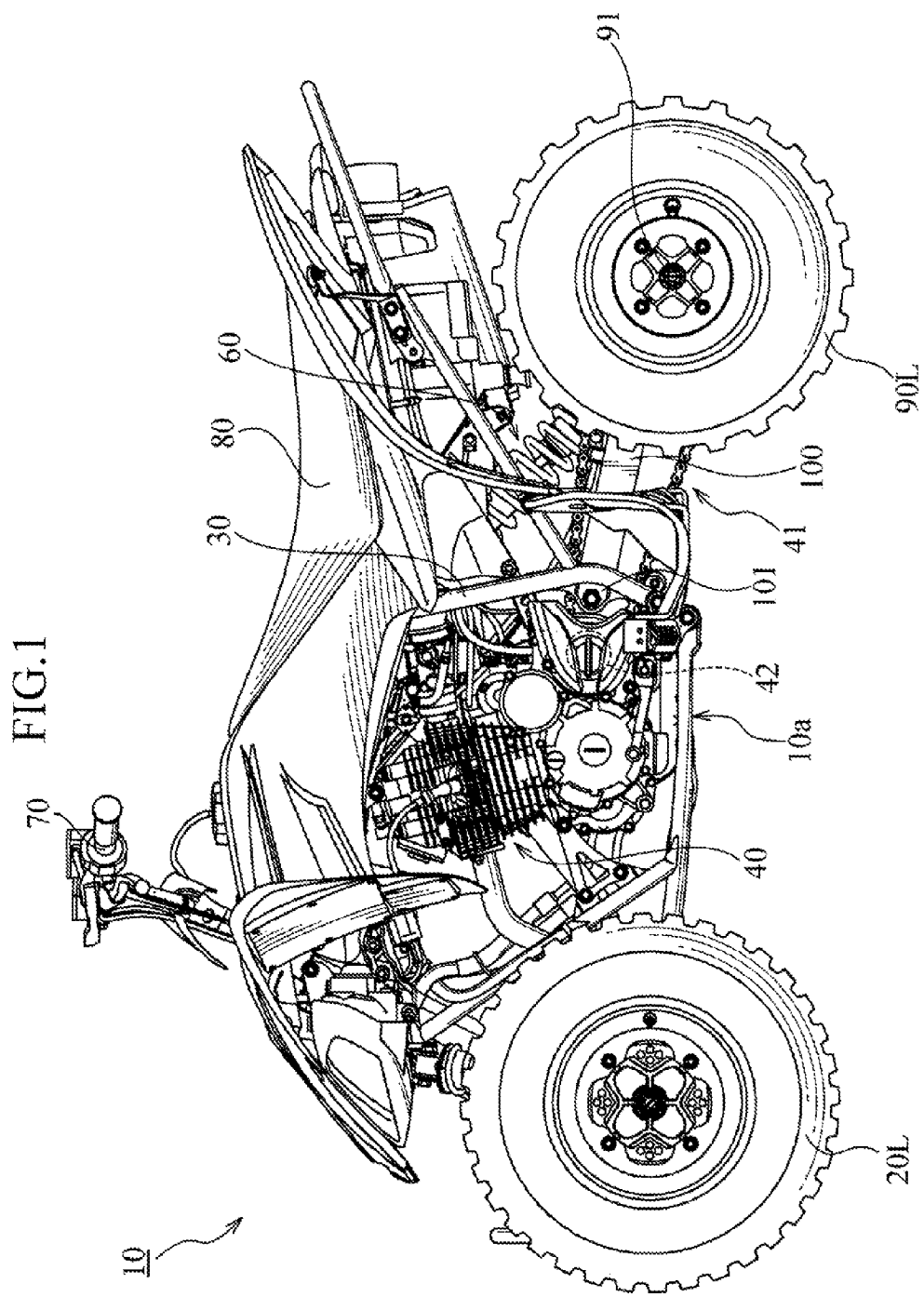
FIG. 1 is a left side view of an all terrain vehicle 10 according to an embodiment of the invention.

An embodiment of the invention will be described. Specifically, (1) Schematic overall structure of all terrain vehicle, (2) Structure of rear portion of rear arm, (3) Shape of eccentric hub, (4) Shape of part support member, (5) Operation and advantages, and (6) Other embodiments will be described.

In the drawings, the same or similar parts in each of the drawings are identified by the same or similar reference numerals. It should be noted that the drawings are schematic, so that the proportions of the sizes are different from actual ones.

Thus, specific sizes should be determined in consideration of the following description. It should also be noted that the relationship and the proportions among the sizes in the drawing may also different.

1. Schematic Overall Structure of All Terrain Vehicle

Figure 2:
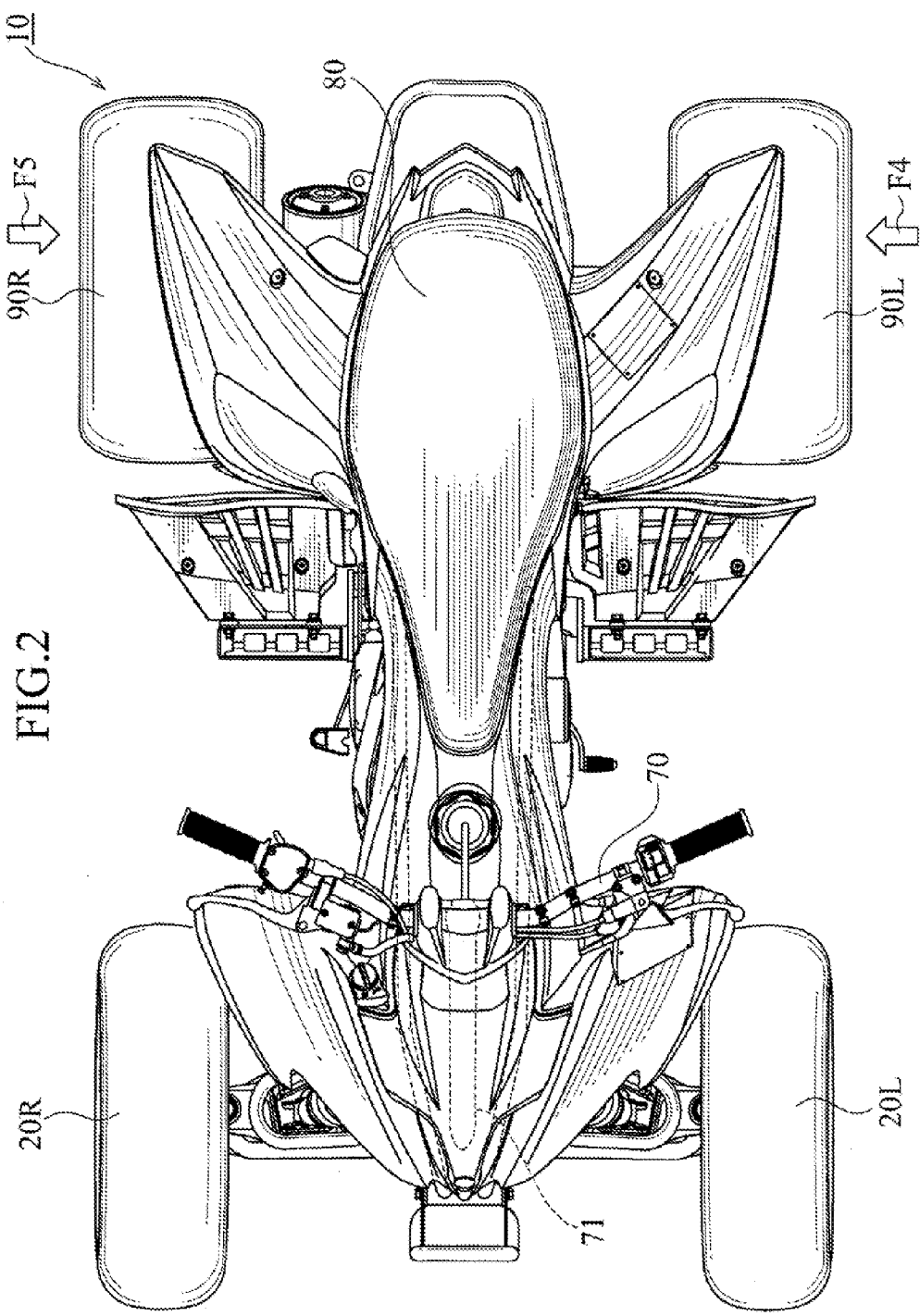
FIG. 2 is a plan view of the all terrain vehicle 10 according to the embodiment of the invention.
Figure 3:
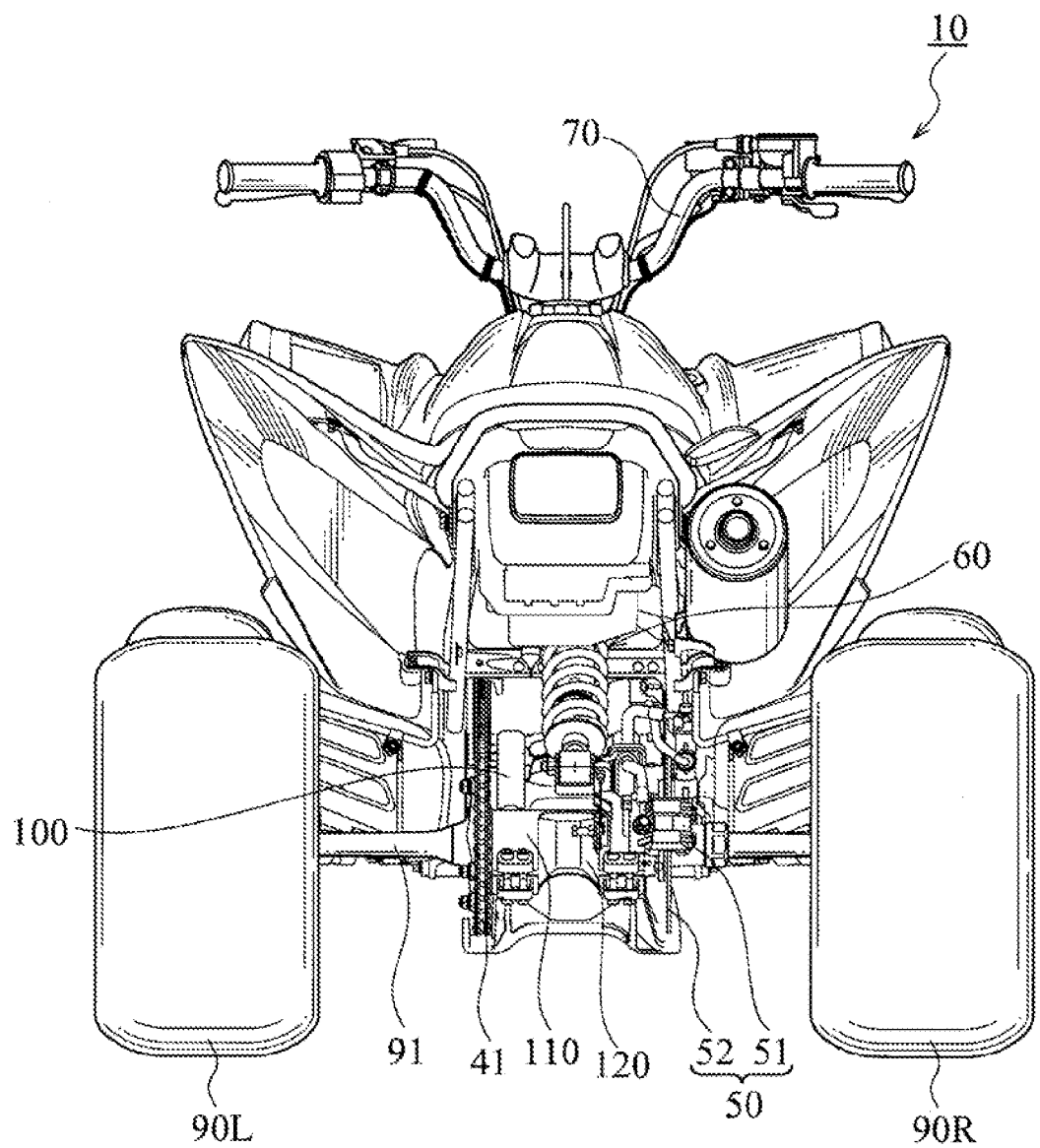
FIG. 3 is a back view of the all terrain vehicle 10 according to the embodiment of the invention.

FIG. 1 is a left side view of an all terrain vehicle 10 according to an embodiment of the invention. FIG. 2 is a plan view of the all terrain vehicle 10. FIG. 3 is a back view of the all terrain vehicle 10.

As shown in FIGS. 1 to 3, the all terrain vehicle 10 includes four wheels, specifically, front wheels 20L and 20R and rear wheels 90L and 90R.

A body frame 30 constitutes the frame of a vehicle body 10a. Mounted on the body frame 30 are an engine 40, a cushion unit 60, a seat 80, a rear arm 100, and so on. In other words, the vehicle body 10a includes the body frame 30, the engine 40, and the rear arm 100.

The engine 40 generates power. The engine 40 transmits the generated power to the rear wheels 90L and 90R via a drive chain 41. The rear wheels 90L and 90R are connected to a rear axle 91 that is rotated with a driven sprocket 43 (not shown in FIGS. 1 to 3, see FIG. 4) around which the drive chain 41 is wound.

The cushion unit 60 is connected to the body frame 30 and the rear arm 100. The cushion unit 60 absorbs the impact on the rear wheels 90L and 90R.

The handle 70 is connected to the front wheels 20L and 20R via a steering shaft 71 (see FIG. 2) and a tie rod (not shown).

The seat 80 is disposed between the front wheels 20L and 20R and the rear wheels 90L and 90R. The rider sits in the seat 80 in such a manner as to straddle the all terrain vehicle 10.

The rear arm 100 supports the rear wheels 90L and 90R so as to pivot substantially vertically. Specifically, the rear arm 100 has a pivot 101 which is pivotally supported by the body frame 30.

As shown in FIG. 3, the rear arm 100 has an axle supporting section 110. The axle supporting section 110 supports the rear axle 91. Specifically, the axle supporting section 110 supports the rear axle 91 by clamping an eccentric hub 120. The rear axle 91 passes through the eccentric hub 120. The eccentric hub 120 rotatably supports the rear axle 91.

The eccentric hub 120 rotatably supports the rear axle 91 in a position eccentric to the radial center (the center C2 in FIG. 7) of the inside diameter of the axle supporting section 110. That is, in the all terrain vehicle 10, the tension of the drive chain 41 is adjusted using the eccentric hub 120.

A disc brake 50 is disposed on the right of the rear arm 100. The disc brake 50 includes a brake caliper 51 and a disc plate 52, and controls the rotation of the rear wheels 90L and 90R. The brake caliper 51 includes a cylinder, a piston, and a brake pad (not shown). The disc plate 52 is a disc that rotates with the rear wheels 90L and 90R. The disc plate 52 is tightened by a brake pad at braking.

2. Structure of Rear Portion of Rear Arm

Figure 4:
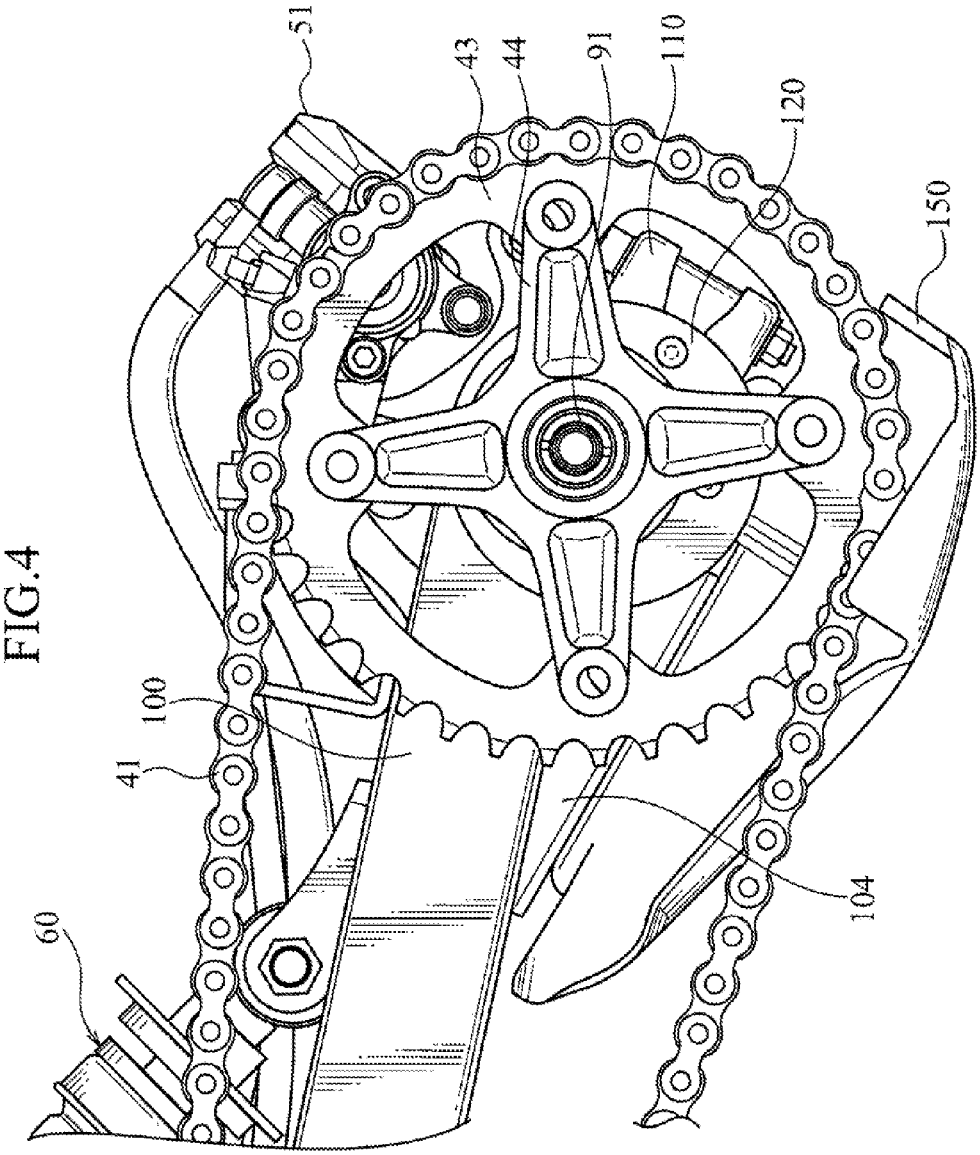
FIG. 4 is a fragmentary enlarged left side view of the rear portion of a rear arm 100 according to the embodiment of the invention.
Figure 5:
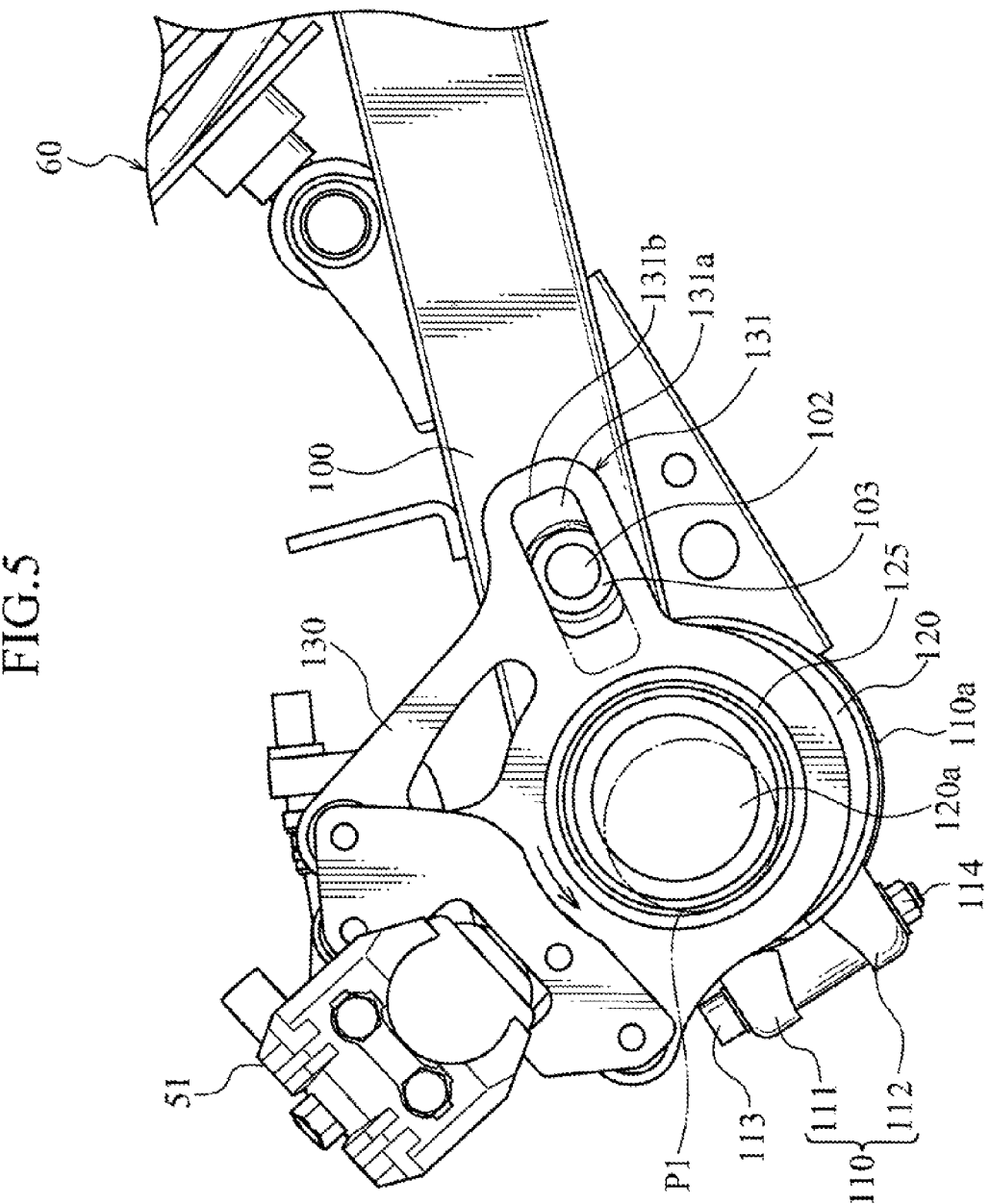
FIG. 5 is a fragmentary enlarged right side view of the rear portion of the rear arm 100 according to the embodiment of the invention.
Figure 6:
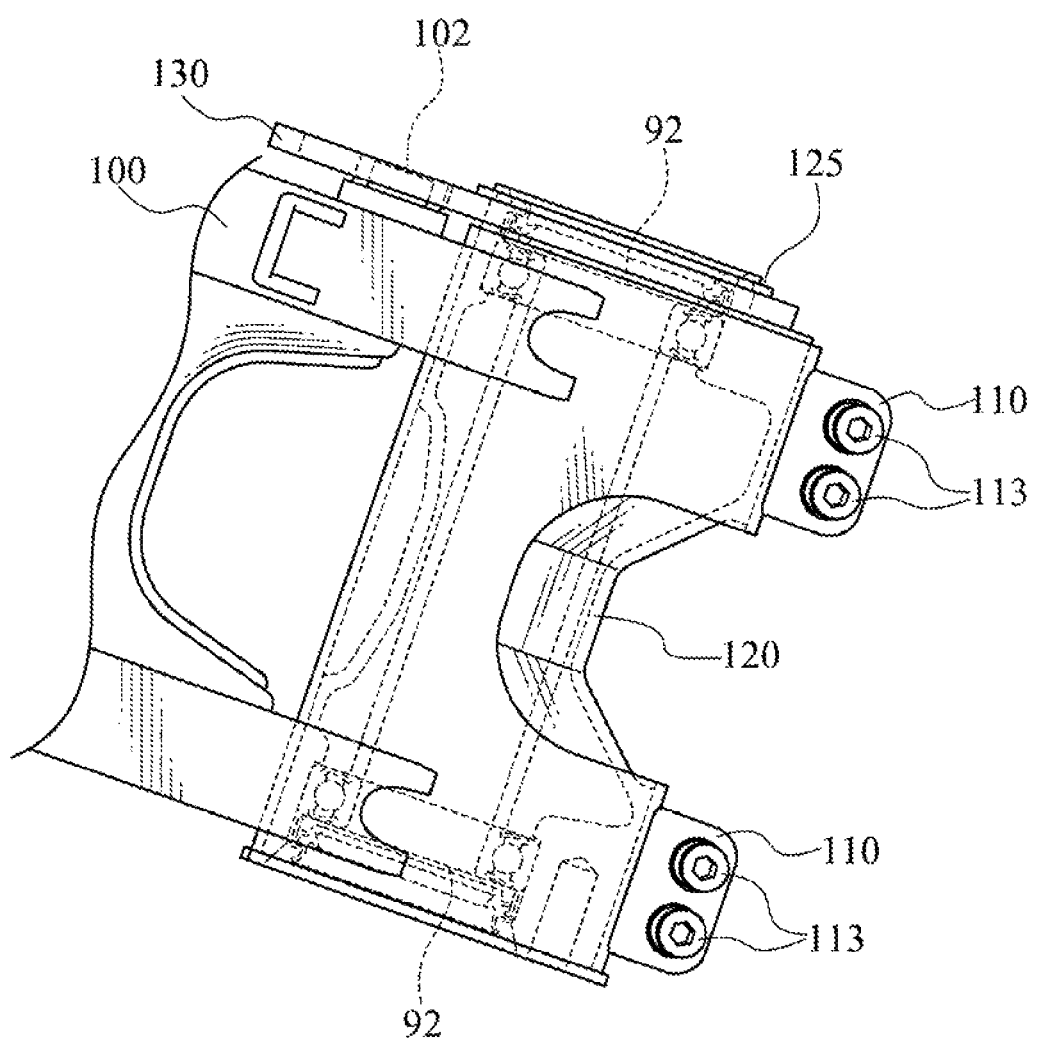
FIG. 6 is a fragmentary enlarged plan view of the rear portion of the rear arm 100 according to the embodiment of the invention.

Referring now to FIGS. 4 to 6, the structure of the rear portion of the rear arm 100 will be described. FIG. 4 is a fragmentary enlarged left side view of the rear portion of the rear arm 100. Specifically, FIG. 4 is a diagram as viewed along an arrow F4 shown in FIG. 2. FIG. 4 omits the indication of the rear wheel 90L.

FIG. 5 is a fragmentary enlarged right side view of the rear portion of the rear arm 100. Specifically, FIG. 5 is a diagram as viewed along an arrow F5 shown in FIG. 2. FIG. 5 omits the indications of the rear wheel 90L and the rear axle 91 and so on.

FIG. 6 is a fragmentary enlarged plan view of the rear portion of the rear arm 100. FIG. 6 omits the indications of the drive chain 41, the disc brake 50, and the rear axle 91 and so on.

As shown in FIG. 4, the drive chain 41 is wound around the driven sprocket 43. The driven sprocket 43 is configured to rotate with the rear axle 91 and concentric with the rear axle 91. The drive chain 41 is also wound around a drive sprocket 42 (see FIG. 1) disposed ahead of the driven sprocket 43. The drive sprocket 42 is rotated by the engine 40 to transfer the driving force to the driven sprocket 43 via the drive chain 41.

"To be configured to rotate with the rear axle 91" includes "to be directly secured to the rear axle 91" and "to be indirectly secured to the rear axle 91 via a bracket 44". Furthermore, another structure may be employed provided that the driven sprocket 43 rotates with the rear axle 91 without the bracket 44.

In this embodiment, the drive chain 41 is a beltlike transfer section. The drive sprocket 42 is a circular driving section, and the driven sprocket 43 is a circular driven section.

Below the rear arm 100 is mounted a protector 150 for protecting the drive chain 41, the driven sprocket 43, the axle supporting section 110 and so on. Specifically, the protector 150 is mounted to a mounting portion 104 which is triangular as viewed from the side of the all terrain vehicle 10.

As shown in FIGS. 5 and 6, a caliper bracket 130 that supports the brake caliper 51 is disposed on the right of the rear portion of the rear arm 100. Specifically, the caliper bracket 130 is firmly fixed to the eccentric hub 120. In this embodiment, the caliper bracket 130 is a part supporting member.

The caliper bracket 130 has an engaging portion 131 that engages with the rear arm 100. The caliper bracket 130 (the engaging portion 131) specifies the rotating range of the eccentric hub 120 according to the position of engagement with a protruding shaft 102 formed on the rear arm 100. In this embodiment, the engaging portion 131 is a range specifying portion. In this embodiment, the engaging portion 131 has a first engaging portion, and the protruding shaft 102 has a second engaging portion.

Specifically, the engaging portion 131 has a hole shaped to hold the shaft 102 movably. In this embodiment, the engaging portion 131 has a long hole 131a that holds the shaft 102 movably.

In this embodiment, a collar 103 is fitted on the shaft 102. The collar 103 is a circular member which is partly linear along the upper and lower edges of the long hole 131a.

The shaft 102 specifies the rotating range of the eccentric hub 120 by restricting the moving range of the engaging portion 131. Specifically, the shaft 102 restricts the rotating range of the eccentric hub 120 within the range ahead of the position at which the rear axle 91 is most apart from the drive sprocket 42 (see FIG. 1). In this embodiment, referring to FIG. 5, the rear axle 91 can be moved to the position P1 indicated by the chain line. The position P1 is set ahead of the position at which the rear axle 91 is most apart from the drive sprocket 42, that is, ahead of a position at which the drive chain 41 has the highest tension.

The eccentric hub 120 has an axle hole 120a through which the rear axle 91 is passed. The rear axle 91 is rotatably supported by a pair of ball bearings 92 disposed on both sides of the eccentric hub 120.

The caliper bracket 130 is fitted on the right of the eccentric hub 120. A circlip 125 restricts the movement of the eccentric hub 120 along the axis of the rear axle 91. The caliper bracket 130 is retained rotatably about the eccentric hub 120 with the center C1 of the axle hole 120a as the center.

In this embodiment, the caliper bracket 130 is fitted on the eccentric hub 120. The caliper bracket 130 may have the following functions and structure as a part supporting member.

(a) When the eccentric hub 120 is rotated to move the position of the rear axle 91, the part supporting member is also moved with the rear axle 91.

(b) The part supporting member is not rotated with the rotation of the rear axle 91. To prevent the part supporting member from rotating with the rotation of the rear axle 91, for example, the part supporting member has a mechanism to engage with the vehicle body 10a.

The part to which the part supporting member is fitted is not limited to the eccentric hub 120. For example, the part supporting member may be fitted on the rear axle 91. The structure in which the part supporting member is fitted on the rear axle 91 has the following characteristics:

(a) The part supporting member does not directly specify the rotating range of the eccentric hub 120.

(b) The rotating range of the eccentric hub 120 is indirectly restricted by restricting the rearward movement of the rear axle 91.

The axle supporting section 110 is shaped like a circular cylinder having an inside hole 110a. The axle supporting section 110 restricts the rotation of the eccentric hub 120 by clamping the eccentric hub 120. In other words, the eccentric hub 120 is unrotatably retained by being clamped by the axle supporting section 110. The axle supporting section 110 may not necessarily be a circular cylinder having inside diameter but may be a rectangular cylinder or polygonal cylinder instead of a circular hole.

More specifically, the rear end of the axle supporting section 110 is divided into two portions, an upper portion 111 and a lower portion 112. Bolts 113 are passed through the upper portion 111 and the lower portion 112. The eccentric hub 120 is supported such that it is clamped by the upper portion 111 and the lower portion 112. The upper portion 111 and the lower portion 112 are tightened with the bolts 113 and nuts 114 to prevent the eccentric hub 120 supported by the axle supporting section 110 from rotating.

When adjusting the tension of the drive chain 41, the bolts 113 are loosened so that the eccentric hub 120 supported by the axle supporting section 110 can be rotated. When the all terrain vehicle 10 is moved backward, with the eccentric hub 120 supported by the axle supporting section 110 in a rotatable state, the eccentric hub 120 rotates inside the axle supporting section 110 (along the arrow in FIG. 5).

When the eccentric hub 120 rotates inside the axle supporting section 110, the rear axle 91 supported by the eccentric hub 120 and the driven sprocket 43 joined with the rear axle 91 are moved backward. Thus, the tension of the drive chain 41 can be adjusted, or specifically, the tension of the drive chain 41 can be increased by the backward movement of the rear axle 91 and the driven sprocket 43.

When the eccentric hub 120 rotates inside the axle supporting section 110, the caliper bracket 130 fixed to the eccentric hub 120 moves with the rotation of the eccentric hub 120.

When the eccentric hub 120 is further rotated, the shaft 102 passed through the long hole 131a comes into contact with the front end 131b of the engaging portion 131. The contact of the shaft 102 with the front end 131b restricts further backward movement of the eccentric hub 120, that is, the rear axle 91.

3. Shape of Eccentric Hub

Figure 7:
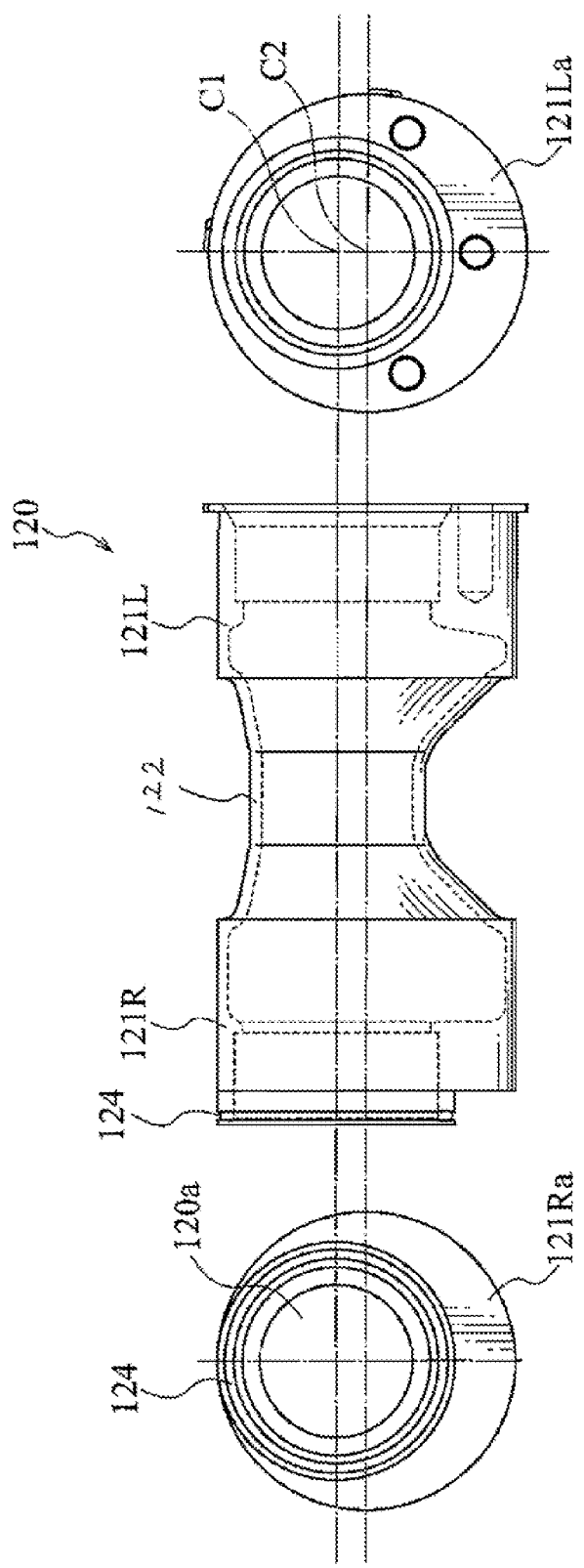
FIG. 7 shows a right side view, a front view, and a left side view of an eccentric hub 120 according to the embodiment of the invention.

FIG. 7 shows a right side view, a front view, and a left side view of the eccentric hub 120. As shown in FIG. 7, the eccentric hub 120 has supported portions 121L and 121R supported by the axle supporting section 110. The eccentric hub 120 further has a recessed portion 122 between the supported portions 121L and 121R. There is an engage portion 124 on which the caliper bracket 130 is fitted on the outside end of the width direction of the supported portion 121R.

The eccentric hub 120 has the axle hole 120a eccentric to the center C2 of the eccentric hub 120. Specifically, the center C1 of the axle hole 120a is off the center C2 of the eccentric hub 120. In other words, the eccentric hub 120 rotatably supports the rear axle 91 in a position eccentric to the center C2 of the axle supporting section 110.

To this end, supported portions 121L and 121R have crescent portions 121La and 121Ra along the axle holes 120a, respectively.

4. Shape of Part Supporting Member

Figure 8:
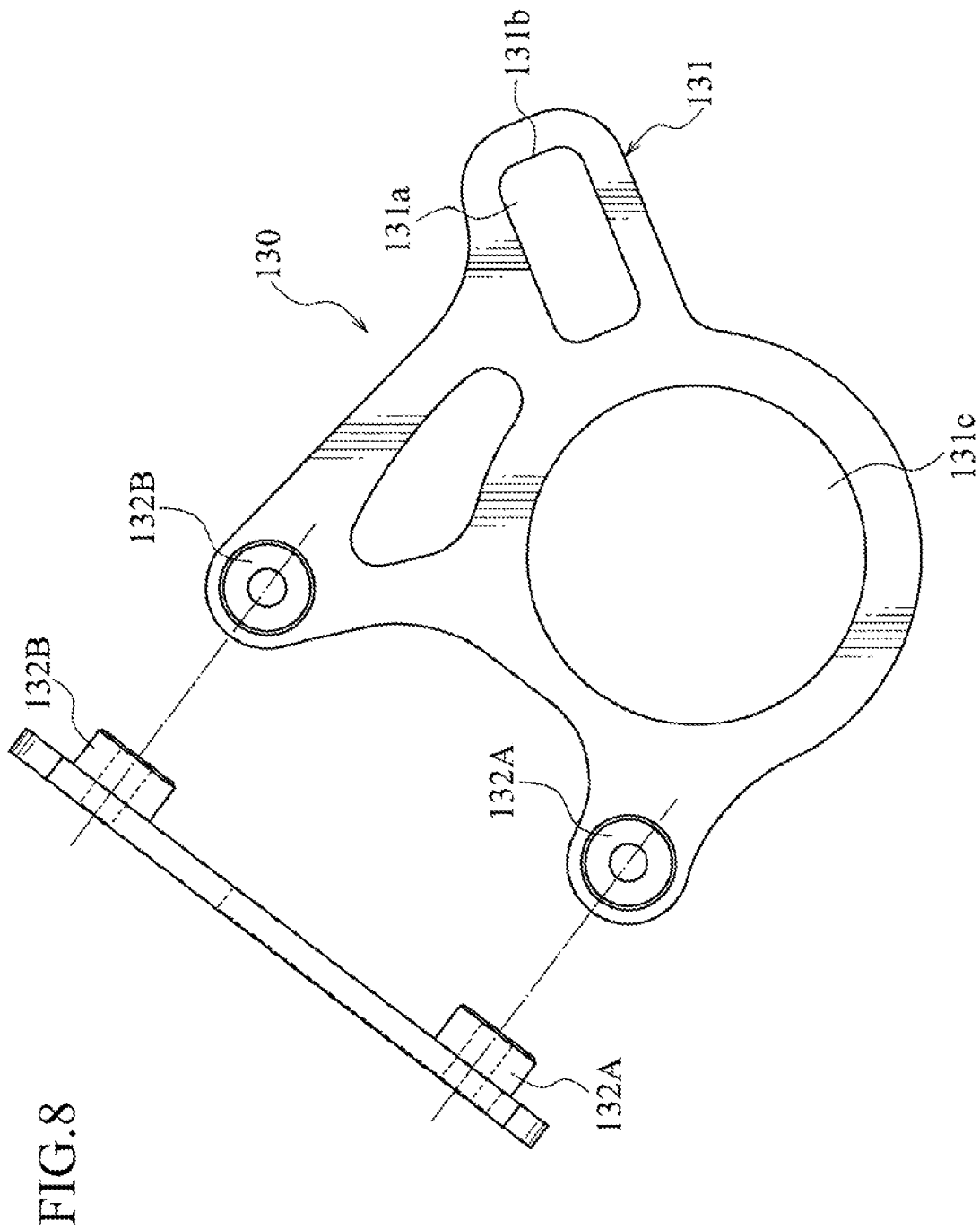
FIG. 8 is a diagram of a caliper bracket 130 simple body according to the embodiment of the invention.

FIG. 8 is a diagram of the caliper bracket 130 simple body serving as a part supporting member in this embodiment. As shown in FIG. 8, the caliper bracket 130 has the engaging portion 131 and caliper mounting portions 132A and 132B. The caliper bracket 130 further has a circular hole 131c in which the engage portion 124 of the eccentric hub 120 is fitted.

As described above, the front end 131b of the engaging portion 131 is brought into contact with the shaft 102 (see FIG. 5) passed through the long hole 131a by rotating the eccentric hub 120. In this embodiment, the caliper bracket 130 is made of iron, in which the long hole 131a is formed by fine blanking.

The caliper mounting portions 132A and 132B are fitted with the brake caliper 51 (see FIG. 5).

5. Operation and Advantages

In the all terrain vehicle 10, the caliper bracket 130 has the engaging portion 131 that engages with the rear arm 100 and specifies the rotating range of the eccentric hub 120 according to the position of engagement with the rear arm 100. Specifically, the engaging portion 131 has the long hole 131a that holds the shaft 102 movably.

Therefore, in the structure for adjusting the tension of the drive chain 41 using the eccentric hub 120 that rotatably supports the rear axle 91 in a position eccentric to the center C2 of the axle supporting section 110, this can prevent the tension of the drive chain 41 from being loosened due to excessive backward movement of the all terrain vehicle 10 during adjustment of the tension of the drive chain 41.

That is, there is no need to take into consideration that the tension of the drive chain 41 is loosened by excessive backward movement of the all terrain vehicle 10 during adjustment of the tension of the drive chain 41, allowing the tension of the drive chain 41 to be adjusted easily and reliably.

In this embodiment, the caliper bracket 130 is brought into engagement with the rear arm 100 using the engaging portion 131 so that the rotating range of the eccentric hub 120 is restricted. This structure eliminates the need for using a dedicated part for restricting the rotating range of the eccentric hub 120, thus reducing the manufacturing cost and the weight of the all terrain vehicle 10.

6. Other Embodiments

While the invention has been described with reference to a preferred embodiment of the invention, it should not be understood that the description and drawings that constitute part of the invention limit the invention. It will be obvious to those skilled in the art that various modifications can be made.

For example, in the foregoing embodiment, the rotating range of the eccentric hub 120 is restricted by the engagement of the protruding shaft 102 formed on the rear arm 100 with the caliper bracket 130 fixed to the eccentric hub 120. Instead, the rotating range of the eccentric hub 120 may be restricted by the structures shown in FIGS. 9 and 10.

Figure 9:
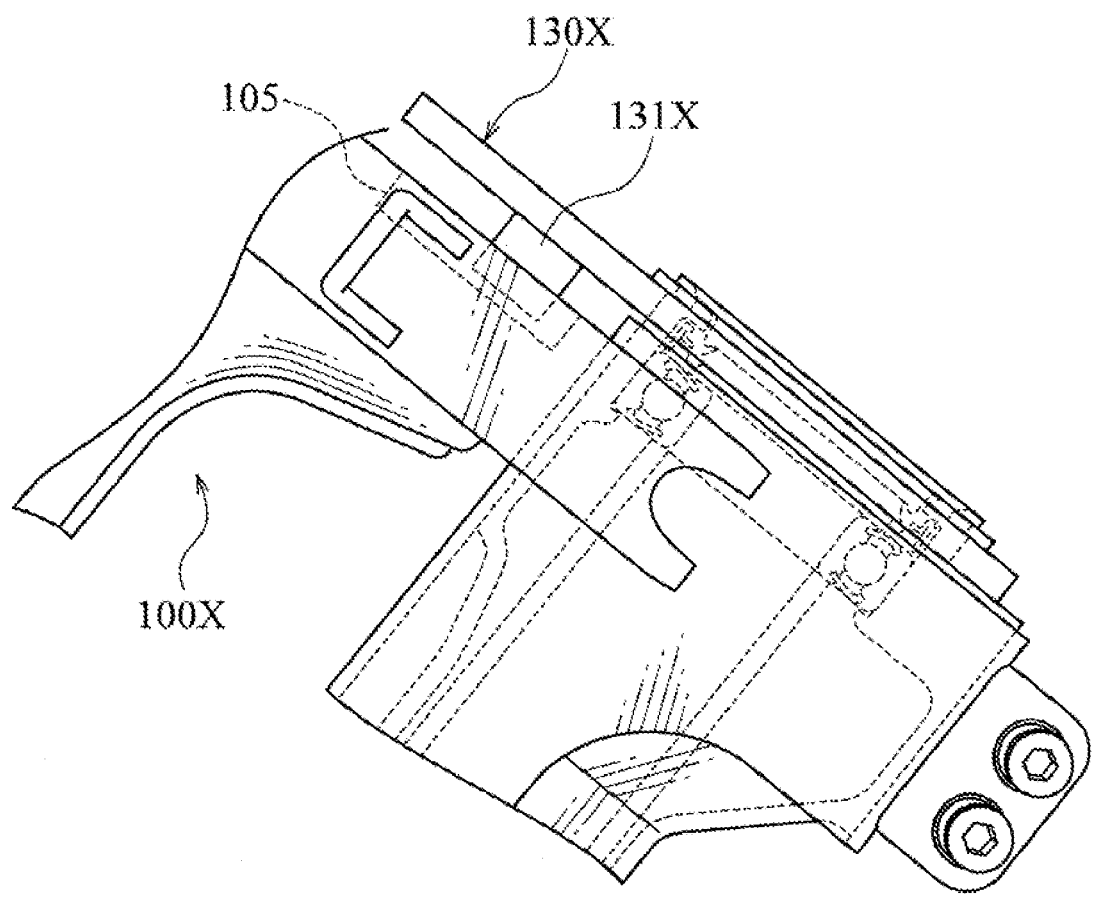
FIG. 9 is a fragmentary enlarged plan view of a rear arm 100X according to a modification of the embodiment the invention.

FIG. 9 is a fragmentary enlarged plan view of the rear portion of a rear arm 100X according to a modification of the invention. As shown in FIG. 9, a caliper bracket 130X has a protruding engaging portion 131X. The rear arm 100X has a long hole 105 through which the protruding engaging portion 131X is passed. The long hole 105 has a hole shape to hold the protruding engaging portion 131X movably.

Figure 10:
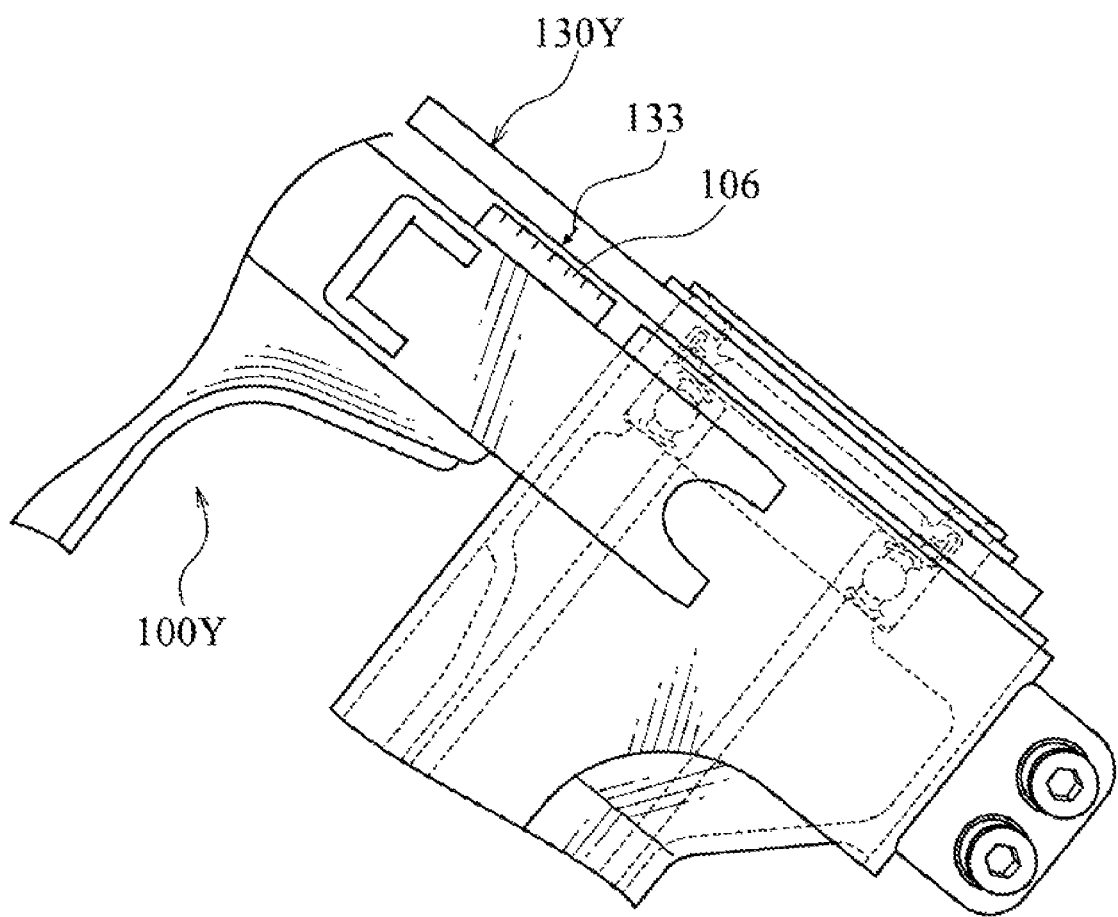
FIG. 10 is a fragmentary enlarged plan view of a rear arm 100Y according to another modification of the embodiment the invention.

FIG. 10 is a fragmentary enlarged plan view of a rear arm 100Y according to another modification of the invention.

The rear arm 100Y has a scale 106 on the right side. A caliper bracket 130Y has a marker 133 indicative of the position of the caliper bracket 130Y with respect to the rear arm 100Y, that is, the position of the eccentric hub 120 at which the caliper bracket 130Y is fixed.

The structures shown in FIGS. 9 and 10 also allow the rotating range of the eccentric hub 120 to be specified during adjustment of the tension of the drive chain 41.

While the above embodiment is constructed such that the caliper bracket 130 is brought into engagement with the rear arm 100 by the engaging portion 131, a dedicated part may of course be used for engagement with the rear arm 100.

While the above embodiment uses the drive chain 41, a drive belt such as a cogged belt may be used in place of the drive chain 41.

The invention may of course include various embodiments not described here. The technical scope of the invention is therefore to be determined solely by the specifications according to the claims.

What is claimed is:

1. A tension adjustment mechanism for a vehicle including a rear arm with a cylindrical axle supporting section having a circular inside diameter arranged to support a rear axle and an eccentric hub passing through the cylindrical inside diameter of the cylindrical axle supporting section to support the rear axle rotatably in a position eccentric to a radial center of the cylindrical I inside diameter of the cylindrical axle supporting section, comprising:

a part supporting member connected to the eccentric hub in such a manner as to move with a rotation of the eccentric hub; and a range limiter coupled to the part supporting member in such a manner as to limit free movement of the part supporting member to a specified movement range and therefore to limit a rotational movement of the eccentric hub to a specified movement range, wherein the range limiter coupled to the part supporting member includes a first engaging portion arranged to engage with a second engaging portion attached to the rear arm, wherein the range limiter of the part supporting member includes a first position and a second position;

in the first position, the range limiter permits the free movement of the part supporting member, and therefore the range limiter permits the rotational movement of the eccentric hub; and in the second position, the first engaging portion of the range limiter engages the second engaging portion attached to the rear arm, the range limiter blocks the free movement of the part supporting member, and therefore the range limiter blocks the rotational movement of the eccentric hub.

2. The tension adjustment mechanism of claim 1, wherein:

the second engaging portion includes a protruding shape; and the first engaging portion includes a generally rectangular channel that surrounds the second engaging portion and permits free movement of the second engaging portion within the generally rectangular channel in a first direction parallel to a first side of the generally rectangular channel, and in a second direction opposite to said first direction, for a distance that is at least a portion of the length of said first side of the generally rectangular channel.

3. The tension adjustment mechanism of claim 1, wherein:

the first engaging portion includes a protruding shape; and the second engaging portion includes a generally rectangular channel that surrounds the first engaging portion and permits free movement of the first engaging portion within the generally rectangular channel in a first direction parallel to a first side of the generally rectangular channel, and in a second direction opposite to said first direction, for a distance that is at least a portion of the length of said first side of the generally rectangular channel.

4. The tension adjustment mechanism of claim 1, wherein:

the rear arm includes a front portion and a rear portion;

the cylindrical axle supporting section is disposed towards the rear portion of the rear arm; and the range limiter limits the rotational movement of the eccentric hub within a range ahead of a position at which the rear axle is most apart from the front portion of the rear arm.

5. A method of adjusting a tension of a drive transfer section of a vehicle including rear wheels, a rear axle connected to the rear wheels, an eccentric hub through which the rear axle passes to support the rear axle rotatably, a cylindrical axle supporting section having a circular inside diameter and restricting a rotation of the eccentric hub by clamping the eccentric hub with a clamp, a vehicle body including the cylindrical axle supporting section, a circular driven section configured to rotate with the rear axle and to be concentric with the rear axle, a drive transfer section wound around the circular driven section to transfer a driving force to the circular driven section, a circular driving section disposed ahead of the circular driven section to drive the circular driven section via the drive transfer section, and a part supporting member arranged to move with a movement of the rear axle by the rotation of the eccentric hub, the part supporting member including a range specifying section that engages with the vehicle body to specify a rotating range of the eccentric hub according to a position of engagement with the vehicle body, wherein the eccentric hub rotatably supports the rear axle in a position eccentric to a radial center of the circular inside diameter of the cylindrical axle supporting section, and wherein the range specifying section of the part supporting member includes a first engaging portion arranged to engage with a second engaging portion attached to the vehicle body, wherein the range specifying section of the part supporting member includes a first position and a second position; in the first position the range specifying section permits the free movement of the part supporting member, and therefore the range specifying section permits the rotational movement of the eccentric hub; and in the second position, the first engaging portion of the range specifying section engages the second engaging portion attached to the vehicle body, the range specifying section blocks the free movement of the part supporting member, and therefore the range specifying section blocks the rotational movement of the eccentric hub, the method comprising the steps of:

freeing the rotation of the eccentric hub by opening the clamp of the cylindrical axle supporting section;

adjusting the tension of the drive transfer section by rotating the rear wheels of the vehicle causing the eccentric hub through which the rear axle passes to rotate, and therefore causing a distance between the circular driven section concentric to the rear axle and the circular driving section disposed ahead of the circular driven section to adjust, wherein said rotation of the rear wheels is limited by the range specifying section of the part supporting member to a rotating range such that the rear axle does not reach a position farthest apart from the circular driving section; and restricting the rotation of the eccentric hub by closing the clamp of the cylindrical axle supporting section.

6. An all terrain vehicle comprising:

rear wheels;

a rear axle connected to the rear wheels;

an eccentric hub through which the rear axle passes, and arranged to support the rear axle rotatably;

a cylindrical axle supporting section having a circular inside diameter and arranged to restrict rotation of the eccentric hub by clamping the eccentric hub;

said eccentric hub arranged to rotatably support the rear axle in a position eccentric to a radial center of the circular inside diameter of the cylindrical axle supporting section;

a vehicle body including the axle supporting section;

a circular driven section configured to rotate with the rear axle and to be concentric with the rear axle;

a drive transfer section wound around the circular driven section, and arranged to transfer a driving force to the circular driven section; and a part supporting member arranged to move with a movement of the rear axle by rotation of the eccentric hub, the part supporting member including a range specifying section that engages with the vehicle body in such a manner as to limit free movement of the part supporting member to a specified movement range and therefore to limit a rotational movement of the eccentric hub to a specified movement range, and wherein:

the range specifying section of the part supporting member includes a first engaging portion arranged to engage with a second engaging portion attached to the vehicle body, wherein the range specifying section of the part supporting member includes a first position and a second position;

in the first position the range specifying section permits the free movement of the part supporting member, and therefore the range specifying section permits the rotational movement of the eccentric hub; and in the second position, the first engaging portion of the range specifying section engages the second engaging portion attached to the vehicle body, the range specifying section blocks the free movement of the part supporting member, and therefore the range specifying section blocks the rotational movement of the eccentric hub.

7. The all terrain vehicle according to claim 6, further comprising:

a circular driving section disposed ahead of the circular driven section and arranged to drive the circular driven section via the drive transfer section, wherein the second engaging portion limits the rotational movement of the eccentric hub within a range ahead of a position at which the rear axle is most apart from the circular driving section.

8. The all terrain vehicle according to claim 6, wherein the second engaging portion includes a protruding shape; and the first engaging portion includes a hole that movably holds the second engaging portion.

9. The all terrain vehicle according to claim 8, wherein the hole is an elongated hole that movably holds the second engaging portion.

10. The all terrain vehicle according to claim 6, wherein the first engaging portion includes a protruding shape; and the second engaging portion includes a hole that movably holds the first engaging portion.

11. The all terrain vehicle according to claim 6, further comprising:

a disc brake arranged to brake the rotation of the rear wheels, wherein the disc brake includes a brake caliper; and the part supporting member supports the brake caliper.

12. A method of providing for adjustment of a tension of a drive transfer section of a vehicle including rear wheels, a rear axle connected to the rear wheels, an eccentric hub through which the rear axle passes to support the rear axle rotatably, a cylindrical axle supporting section having a circular inside diameter and restricting rotation of the eccentric hub by clamping the eccentric hub with a clamp, a vehicle body including the cylindrical axle supporting section, a circular driven section configured to rotate with the rear axle and to be concentric with the rear axle, a drive transfer section wound around the circular driven section to transfer a driving force to the circular driven section, a circular driving section disposed ahead of the circular driven section to drive the circular driven section via the drive transfer section, and a part supporting member arranged to move with a movement of the rear axle by the rotation of the eccentric hub, the part supporting member including a range specifying section arranged to engage with the vehicle body to specify a rotating range of the eccentric hub according to a position of engagement with the vehicle body, wherein the eccentric hub rotatably supports the rear axle in a position eccentric to a radial center of the cylindrical inside diameter of the cylindrical axle supporting section, and wherein the range specifying section of the part supporting member includes a first engaging portion arranged to engage with a second engaging portion attached to the vehicle body, wherein the range specifying section of the part supporting member includes a first position and a second position; in the first position the range specifying section permits the free movement of the part supporting member, and therefore the range specifying section permits the rotational movement of the eccentric hub; and in the second position, the first engaging portion of the range specifying section engages the second engaging portion attached to the vehicle body, the range specifying section blocks the free movement of the part supporting member, and therefore the range specifying section blocks the rotational movement of the eccentric hub, the method comprising the steps of:

freeing the rotation of the eccentric hub by opening the clamp of the cylindrical axle supporting section;

adjusting the tension of the drive transfer section by rotating the rear wheels of the vehicle causing the eccentric hub through which the rear axle passes to rotate, and therefore causing a distance between the circular driven section concentric to the rear axle and the circular driving section disposed ahead of the circular driven section to adjust, wherein said rotation of the rear wheels is limited by the range specifying section of the part supporting member to a rotating range such that the rear axle does not reach the position farthest apart from the circular driving section; and restricting rotation of the eccentric hub by closing the clamp of the cylindrical axle supporting section.

* * * * *